(12) United States Patent
Andree et al.

(10) Patent No.: US 11,817,286 B2
(45) Date of Patent: Nov. 14, 2023

(54) ELECTRICAL POWER TRANSMISSION DEVICE

(71) Applicant: SIEMENS ENERGY GLOBAL GMBH & CO. KG, Munich (DE)

(72) Inventors: Hendrik Andree, Oberaurach/Dankenfeld (DE); Thomas Lehmann, Berlin (DE); Benjamin Zaedow, Berlin (DE); Matthias Heinecke, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 401 days.

(21) Appl. No.: 17/282,072

(22) PCT Filed: Sep. 4, 2019

(86) PCT No.: PCT/EP2019/073549
§ 371 (c)(1),
(2) Date: Apr. 1, 2021

(87) PCT Pub. No.: WO2020/069808
PCT Pub. Date: Apr. 9, 2020

(65) Prior Publication Data
US 2021/0327658 A1 Oct. 21, 2021

(30) Foreign Application Priority Data
Oct. 1, 2018 (DE) .................. 10 2018 216 849.0

(51) Int. Cl.
*H01H 9/16* (2006.01)
*H02J 13/00* (2006.01)
*H02B 13/035* (2006.01)

(52) U.S. Cl.
CPC ......... *H01H 9/168* (2013.01); *H02B 13/0356* (2013.01); *H02J 13/00006* (2020.01); *H02J 13/00036* (2020.01)

(58) Field of Classification Search
CPC ............... H01H 9/168; H02B 13/0356; H02J 13/00006; H02J 13/00036; H02J 13/00034; Y02E 60/00; Y04S 40/12
See application file for complete search history.

(56) References Cited

U.S. PATENT DOCUMENTS 8,502,542 B2 * 8/2013 Couture .............. G01R 31/085
324/508
2008/0087115 A1 4/2008 Hanai et al.

FOREIGN PATENT DOCUMENTS

DE 102016202853 A1 8/2017
EP 3001204 A1 3/2016
(Continued)

OTHER PUBLICATIONS

Fraunhofer-Gesellschaft et al, "Sensor system with energy self-sufficient sensor modules using energy harvesting to monitor the operating parameters (condition monitoring) of high voltage overhead lines", Duisburg, Germany, Aug. 28, 2019 (Aug. 28, 2019), Retrieved from the Internet: https://www.ims.fraunhofer.de/de/Geschaeftsfelder/ Wireless-Transponder-Systems/Anwendungen/Ueberwach ung-Freileitungen.html, retrieved on 2019-11-20, XP055644739, the whole document.

*Primary Examiner* — An T Nguyen
(74) *Attorney, Agent, or Firm* — Laurence A. Greenberg; Werner H. Stemer; Ralph E. Locher (57) ABSTRACT

An electrical power transmission device includes at least one switching unit having at least one contact fitting for electrically contacting the switching unit. Furthermore, the switching unit has a sensor for monitoring the state of the switching (Continued)

unit. The sensor is supported by the contact fitting. The sensor is at least partially masked by the contact fitting.

11 Claims, 7 Drawing Sheets

(56) References Cited

FOREIGN PATENT DOCUMENTS

| | | | |
|---|---|---|---|
| EP | 3279027 | A1 | 2/2018 |
| JP | 2005346442 | A | 12/2005 |
| JP | 2008099459 | A | 4/2008 |

* cited by examiner

ELECTRICAL POWER TRANSMISSION DEVICE

BACKGROUND OF THE INVENTION

Field of the Invention

The invention is situated in the field of electrical energy transmission devices having a switching unit with at least one contact fitting for making electrical contact with a switching point of the switching unit and a sensor for monitoring the state of the switching unit.

An electrical energy transmission device serves to transmit electrical energy. One part of an electrical energy transmission device is a switching unit that has at least one contact fitting for the connection of the switching unit. The electrical energy transmission device furthermore has a sensor for monitoring the state of the switching unit.

In known devices, use is made of expensive sensors that use algorithms to perform error correction on the data delivered by the sensor. This means that an increased amount of computational power needs to be made available and needs to be supplied with energy. In addition to increased energy consumption, additional installation space is often required.

SUMMARY OF THE INVENTION

The object of the invention is therefore to specify an electrical energy transmission device having a switching unit and a sensor that allows reliable and long-term operation of the sensor, with the sensor having an inexpensive design.

According to the invention, the object is achieved, in the case of an electrical energy transmission device of the type mentioned at the outset, in that the sensor is carried by the contact fitting.

An electrical energy transmission device is used to transmit electrical energy. To this end, the electrical energy transmission device has a switching unit. The switching unit serves to change an impedance of a switching point of a current path. By way of example, the switching unit may have switching contact parts that are able to be moved in relation to one another so as to form a switching point, which switching contact parts bring about an impedance change on the basis of a relative movement of the switching contact parts with respect to one another. There may however also be provision for example to change a potential using a semiconductor element. Electrical energy transmission devices operate in particular in the medium-voltage and high-voltage range, that is to say at rated voltages of several 1000 V up to several 100 000 V, for example more than 1 000 000 V. In order to be able to incorporate the switching unit into a phase conductor line, the switching unit is connected at least to a contact fitting. The contact fitting allows access to the variable-impedance current path (switching point) of the switching unit. It is thus possible to allow the phase conductor line that is connected to the contact fitting to bear on the switching unit in electrical contact therewith. Multiple contact fittings may preferably be provided, in particular for example in order to be able to connect the phase conductor line on both sides of a switching point of the switching unit. A contact fitting may for example also serve to electrically conductively connect two switching points of a switching unit to one another (for example in series). A contact fitting may for example also be part of a carrier structure of the switching unit. The contact fitting may for example also form a distribution housing or a transmission housing that serves to transmit a drive movement, on the one hand, and forms an electrically conductive contact fitting, on the other hand. A contact fitting is part of the current path that is to be switched. Switching units are for example circuit breakers, power switches, load switches, grounding switches, rapid grounding switches or else surge arresters, which for example take on a protective function, for example with respect to ground potential, on the basis of a level radio path or a voltage-dependent resistive element. The contact fitting may for example be connected detachably to the switching unit. The contact fitting in this case generally has a high electrical conductivity in order to allow low-impedance incorporation of the switching unit. The contact fitting may in this case preferably serve to position a sensor. The sensor may be carried by the contact fitting. The sensor is accordingly arranged close to the switching point, and thus generally close to a critical region of a switching unit, on the one hand, but far enough away from the switching point that the function of the sensor is not influenced for example by switching of the switching point, for example by mechanical vibrations. Such an assembly of the sensor furthermore has the advantage that it is also possible to perform retrofitting. The sensor may for example bear on a surface of the contact fitting and be thermally linked thereto. In particular when using sensors that serve to sense a temperature of the contact fitting, such thermal contact between the sensor and the contact fitting is advantageous, since thermal transfers between the sensor and the contact fitting are thus reduced. In addition to measuring a temperature, the sensor may additionally or alternatively also measure other physical variables. By way of example, an electric current, a voltage, a force, for example based on a wind load, a strain, other pulses, air humidity, brightness, movements, changes in position, etc. may serve for this purpose.

A further advantageous refinement may make provision for the sensor to be at least partly masked by the contact fitting.

The sensor is carried by the contact fitting. Provision may advantageously be made here for the contact fitting to at least partially mask the sensor. This means that direct access to the sensor, at least from a direction through the contact fitting, is prevented at least at certain times or in certain sections. There may advantageously be provision here for the sensor to be masked completely by the contact fitting. The contact fitting may form mechanical protection for the sensor. As an alternative or in addition, the contact fitting may at least partially dielectrically mask the sensor. A sensor may be arranged for example in regions on the contact fitting that are at least partly shielded by the contact fitting. To this end, the contact fitting may for example comprise niches, enclosed angles, etc.

A further advantageous refinement may make provision for the sensor to bear on the contact fitting with a bearing surface and to protrude in the direction of a ground potential with a surface facing away from the bearing surface.

Having a bearing surface bearing on the contact fitting makes it possible, in particular when measuring a temperature, to have a suitable temperature transfer between the contact fitting and the sensor, in particular its bearing surface. By orienting the surface, facing away from the bearing surface, of the sensor in the direction of ground potential, it is furthermore possible to reduce the dielectric effects of the sensor on the contact fitting. This may advantageously take place in conjunction with dielectric masking of the sensor by the contact fitting. A ground potential forms a neutral potential at an electrical energy transmission device. In particular electrical fields or the profile of the electrical fields in the direction of a ground potential may be considered to be less critical in terms of the orientation of the sensor than in the case of an orientation toward a high-voltage potential. A sensor oriented in this way counteracts interference with the field distribution at an electrical energy transmission device. A ground potential may for example also be formed by a mast.

There is also the possibility of retrofitting a sensor on existing contact fittings by installing this on the existing contact fitting, for example using an adhesive bond or a screw connection, such that this is carried by the contact fitting. The sensor, which normally has an influence in dielectric terms, may protrude from the contact fitting in the direction of a ground potential.

A further advantageous refinement may make provision for the sensor to be an energy-self-sufficient sensor.

The contact fitting may carry different electrical potentials depending on the switching state of the switching device. Depending on the size of the electrical potential, it is thereby difficult or even impossible to carry electrical energy for operating the sensor to the sensor in a wired manner, for example. In the case of an energy-self-sufficient sensor, a separate external electrical energy supply is not necessary. Rather, the sensor has for example an energy store, for example a rechargeable battery or a battery. The sensor may also have a generator that provides the energy required to operate the sensor in a manner driven through energy present in the environment. An energy-self-sufficient sensor may in particular draw energy from the currents and voltages present in an electrical energy transmission device. As an alternative, other sources in the environment of the sensor may also be used. By way of example, the sensor may have a bearing surface on which the physical variable to be monitored, in particular here a temperature, is coupled into the sensor, and the sensor may also have a cooling surface that serves to dissipate thermal energy. A generator may use the temperature difference of the bearing surface and the cooling surface to generate electrical energy in order to operate the sensor.

A further advantageous refinement may make provision for the sensor to have a wireless radiation unit whose radiation direction points in the direction of a ground potential.

By virtue of using a wireless radiation unit, in particular in combination with the design of the sensor as an energy-self-sufficient sensor, it is also possible to use the sensor at a high-voltage potential and to operate it there.

In order to transmit information, the sensor has a wireless radiation unit that transmits information from the sensor to a reception device in a radiation direction. The radiation direction should in this case preferably point in the direction of a ground potential, such that a reception device is able to be arranged there, preferably at ground potential. It is thereby possible to couple out information via the sensor across potential differences on the electrical switching unit and transmit it to a reception device. The reception device may for example be arranged on a mast. Information received there may possibly be forwarded. A directional radio path may for example be operated for this purpose.

A further advantageous refinement may make provision for the sensor to be arranged laterally on a contact fitting.

A contact fitting may, in a vertical direction, have a recess for the sensor, on which for example the bearing surface of the sensor bears. The sensor is thus arranged laterally on the contact fitting, wherein, in order for example to receive contact bolts, the latter lie substantially plumb or parallel to the surface on which the sensor is arranged laterally on a contact fitting. In particular in the case of an orientation of a switching point of a switching unit in a horizontal direction, a contact fitting may be arranged on an end face and the sensor may also be positioned on an end face. The sensor may be masked by virtue of the sensor protruding through the contact fitting.

A further advantageous refinement may make provision for the switching unit to be an outdoor switching unit.

An outdoor switching unit is a switching unit that, owing to its design, withstands outdoor weather influences. By way of example, the switching unit may be equipped with an electrically insulating housing that for example carries a ribbed structure in order to counteract the formation of leakage current paths. An outdoor switching unit may for example run in a horizontal orientation. An outdoor switching unit may however also run in a vertical direction in the manner of a column. The orientation in a horizontal direction or vertical direction in this case refers essentially to the position of the contact fittings with respect to one another. In particular in the case of column-shaped vertical designs of the switching unit, the sensor may be arranged underneath a contact fitting in a manner spanned thereby. In this case, connection bolts that serve to make contact with the contact fitting are preferably oriented in a vertical direction. An outdoor switching unit with a horizontal orientation preferably positions the sensor on an end face or between multiple switching points.

A further advantageous refinement may make provision for the sensor to be spanned by an overhead line that is fastened to the contact fitting.

When using outdoor switching units, it is possible to use overhead lines that are fastened to the contact fitting. Overhead lines are connected to the contact fitting for example by way of bolts, wherein the bolts are preferably oriented substantially plumb to the surface on which the sensor is fastened to the contact fitting. The sensor may in this case preferably be spanned by the overhead lines; the sensor may in particular be spanned by the contact fitting itself. Spanning may for example be achieved by virtue of the sensor being covered for example with the overhead line and/or the contact fitting. This thus achieves at least partial mechanical protection for the sensor. This may also achieve protection of the sensor against weathering. There may however also be provision for the outdoor switching unit to provide for example an oblique orientation of the contact fitting, situated between a vertical direction and a horizontal direction. This is possible for example when using switching units in what is known as a dead tank structure in which a switching point is arranged within an electrically conductive encapsulating housing, wherein outdoor bushings are used in order to incorporate the electrical switching unit into a phase conductor line, these outdoor bushings being fastened for example obliquely on the electrically conductive housing. The sensor may be spanned partially or in sections by the overhead lines and/or by the contact fitting.

A further advantageous refinement may make provision for the sensor to be at least partially spanned by the contact fitting.

As an alternative or in addition to the sensor being spanned by an overhead line, the sensor may also be at least partially spanned/delimited by the contact fitting itself. The contact fitting may in this case, in addition to its electrical property, take on a mechanical protection function for the sensor.

There may advantageously furthermore be provision for the sensor to have a thermally reflective surface structure.

In the case of a sensor or the electrical energy transmission device in an outdoor configuration, the sensor is exposed to various external influences, in particular weathering. Using a reflective surface structure for the sensor makes it possible to reduce dynamic loading on the sensor caused by external influences, for example caused by solar irradiation. The sensor may have a corresponding color for this purpose. The sensor may for example have a coating, for example a lacquer. The coating should have a high coefficient of thermal radiation. It is thus possible to reduce a measurement error. The tendency to heat up is also reduced. The sensor may however also have a corresponding structure in terms of its surface structure. By way of example, the sensor may be provided with ribs that have for example a cooling function and are also able to mask one another.

There may furthermore advantageously be provision for the sensor to be arranged on an end face on a switching unit.

Positioning on an end face makes use of a housing end side in order to arrange the contact fitting next to the sensor. This allows easy orientation of the sensor in the direction of a ground potential. Electrical fields around the electrical switching unit are thus influenced only to a small extent. It is also not necessary to intervene in the housing structure of the electrical switching unit.

A switching unit may have an end face on which the sensor is arranged. To this end, the end face of the switching unit is provided with a contact fitting via which the sensor is supported on the switching unit. An end face may preferably be arranged on an insulating housing or electrically insulating housing section of the switching unit. By way of example, the housing may be a substantially rotationally symmetrical hollow housing such as a hollow cylinder, a hollow cone, a hollow truncated cone, etc. A stop point, in particular provided by the contact fitting, may be arranged on the end face in order to incorporate the switching unit into a phase conductor line. Depending on the mounting position, an end face of the switching unit may be positioned in a horizontal direction, a vertical direction or an oblique direction. In order to form an end face, the switching unit may have an electrically insulating section that is held on one side and that protrudes freely in the direction of the end face. In this case, the housing protruding freely in the direction of the end face should preferably have an electrically insulating design. By way of example, an end face that is oriented substantially plumb to the longitudinal axis of the element having the end face, for example an insulating housing, may be formed on an outdoor bushing with an electrically insulating housing, on a switching point with an electrically insulating housing, etc. The insulating housing may form part of an electrically insulating barrier. The electrically insulating barrier may delimit a fluid reception chamber. The fluid reception chamber may enclose an electrically insulating fluid (in particular in the form of a gas), which may flow around and electrically insulate phase conductors arranged in the fluid reception chamber. A switching point of the switching unit may in particular be arranged in the fluid reception chamber. The fluid may be placed under excess pressure so as to improve its electrically insulating properties. The switching unit may be a pressurized fluid-insulated, in particular pressurized gas-insulated switching unit.

One exemplary embodiment of the invention is shown schematically below in a drawing and described in more detail below.

DETAILED DESCRIPTION OF THE INVENTION

Figure 1:
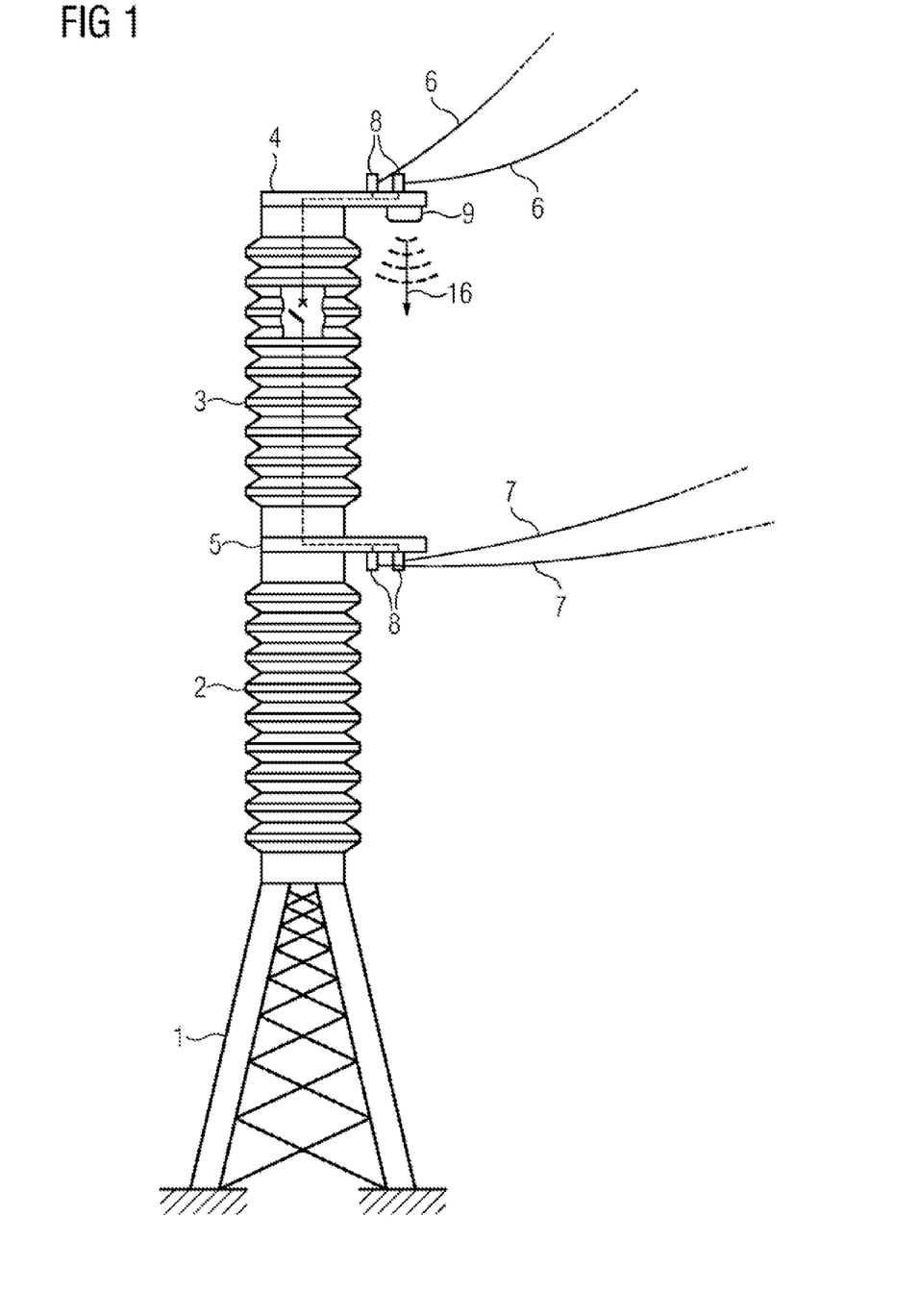
FIG. 1: shows an electrical energy transmission device having a vertical switching unit.
Figure 2:
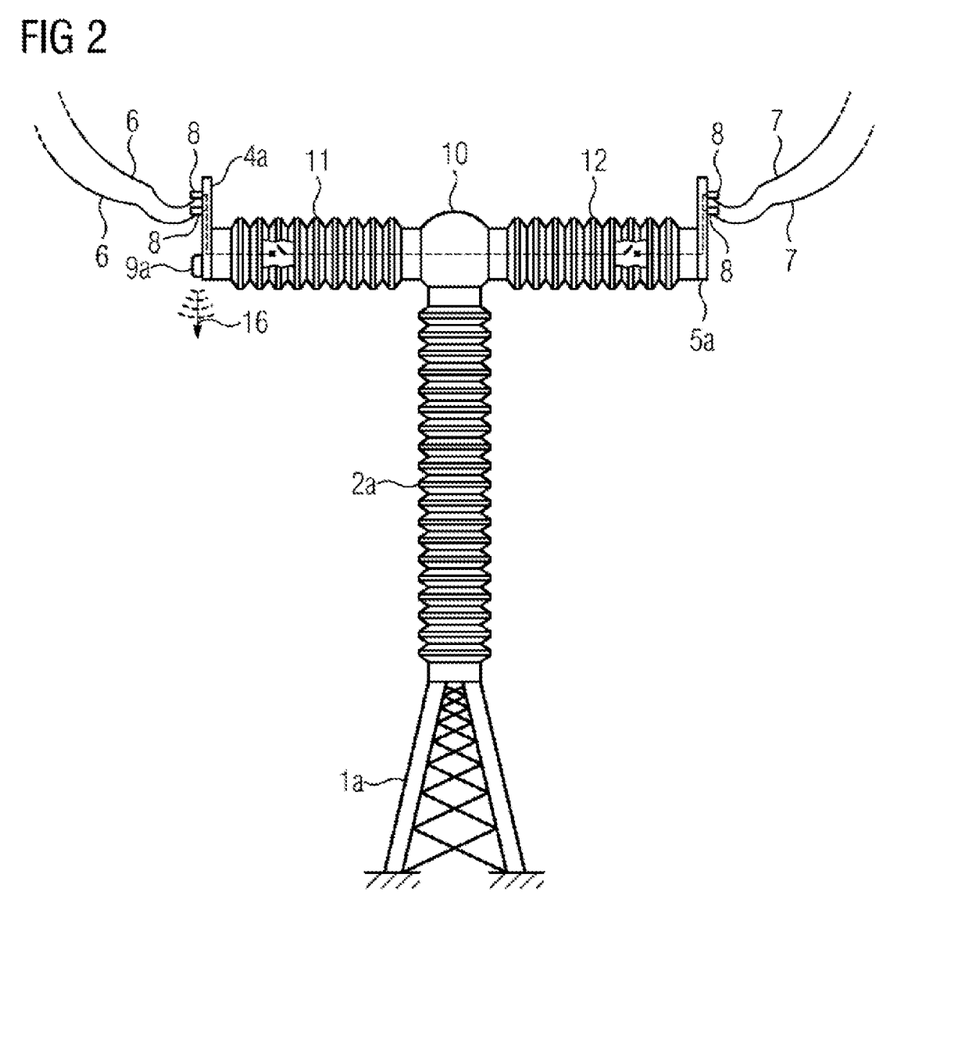
FIG. 2: shows an electrical energy transmission device having a horizontal switching unit.
Figure 3:
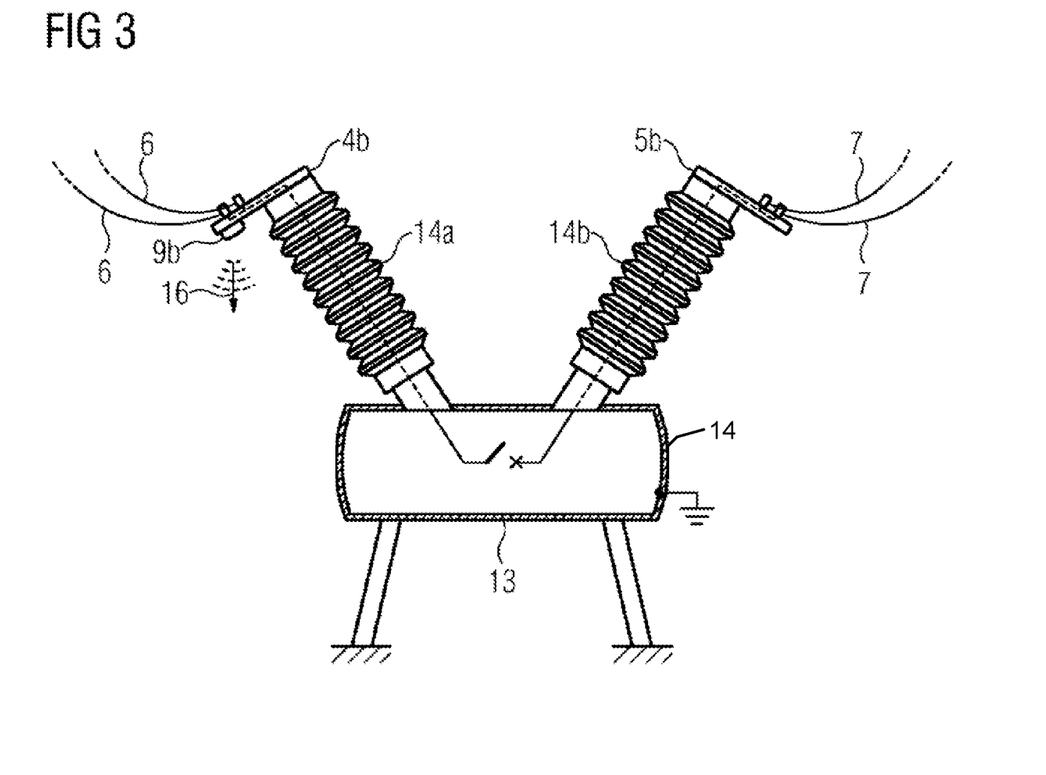
FIG. 3: shows an electrical energy transmission device having a switching unit with a dead tank structure.
Figure 4:
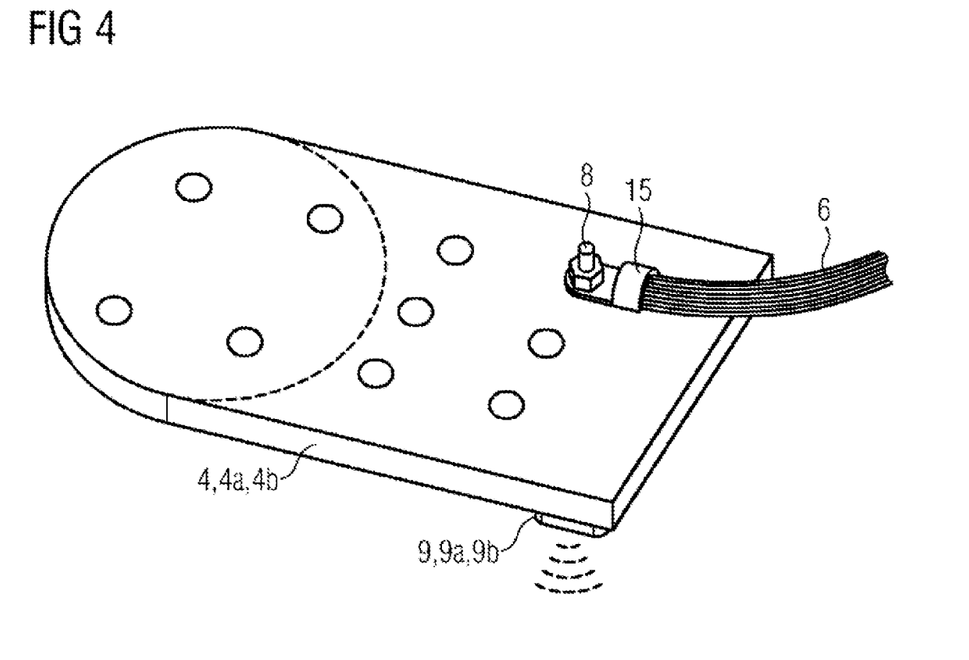
FIG. 4: shows a contact fitting in a first perspective view.
Figure 5:
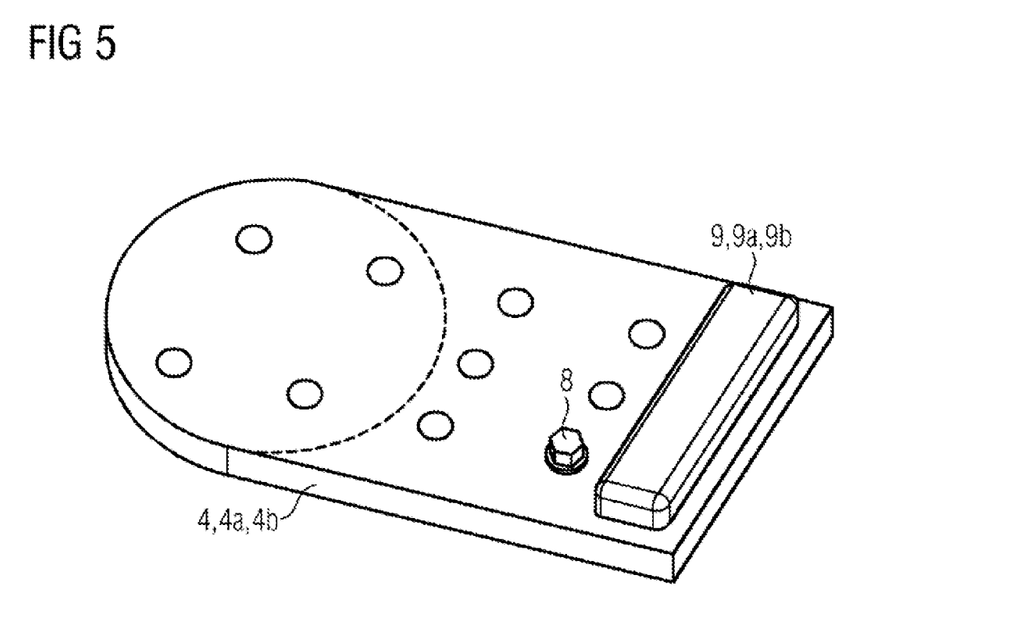
FIG. 5: shows the contact fitting known from FIG. 4 in a second perspective view.

FIGS. 1, 2 and 3 each show the possibility of mounting a sensor on a switching unit. FIGS. 4 and 5 furthermore show the possibility of mounting the arrangement of a sensor on a contact fitting.

FIGS. 1 to 3 each show switching units that have switching contact parts able to be moved in relation to one another and that are able to perform a switching operation (change the impedance of a current path) through a relative movement of the switching contact parts. The invention may furthermore also be used on other switching units that operate for example using a semiconductor to change the impedance. A switching unit should also be understood to mean for example what is known as a surge arrester that has a voltage-dependent resistive element and that performs a switching operation, that is to say changes the impedance of the voltage-dependent resistive element, in a voltage-dependent manner.

The vertical switching unit shown in FIG. 1 has a carrier frame 1. The vertical switching unit is positioned using the carrier frame 1. The vertical switching unit has a support insulator 2 that supports a switching point 3 of the vertical switching unit in an electrically insulated manner. The support insulator 2 has a substantially hollow-cylindrical design and is connected, on the end face, firstly to the carrier frame 1 and secondly to the switching point 3. The switching point 3 has an insulating housing inside which switching contact parts, able to be moved in relation to one another, of the vertical switching unit are positioned. The insulating housing is closed off in a fluidtight manner at the end sides of the switching point 3, wherein it is possible to create electrical contact between the switching contact parts located inside the insulating housing through the fluidtight connection. The hollow axis of the insulating housing is oriented substantially vertically. A single line diagram is accordingly indicated in FIG. 1. A first contact fitting 4 and a second contact fitting 5 are arranged on the end face on the end sides of the insulating housing of the switching point 3. The two contact fittings 4, 5 are arranged in a manner spaced from one another along a vertical direction. The two contact fittings 4, 5 have a substantially identical design. The contact fittings 4, 5 serve to fasten overhead lines 6, 7. The vertical switching unit according to FIG. 1 is able to be incorporated into an electrical energy transmission network via the overhead lines 6, 7, wherein the switching point 3 of the vertical switching unit is arranged between the overhead lines 6, 7. In the present case, the overhead lines 6, 7 each have a two-core design, such that a flow of current through the overhead lines 6, 7 is divided in each case over two cores of the respective overhead line 6, 7. In order to create contact between the overhead line 6, 7 and the respective contact fitting 4, 5, provision is made in each case for bolts 8 to which the overhead lines 6, 7 are able to be connected, for example by way of cable shoes (cf. illustrations in FIG. 4).

During operation of a switching unit, heating is caused by a flow of current through the closed switching point 3 or through the overhead lines 6, 7 and the contact fittings 4, 5. Thermal energy may also be introduced into the system from the outside. Depending on the ambient temperature, in particular in the case of providing an outdoor configuration of a switching unit, as shown in FIG. 1, introduction or emission of thermal energy into or out of the switching unit may take place with varying intensity.

In order to monitor the state of the switching unit, a sensor 9 is attached to the first contact fitting 4. The first contact fitting 4 in this case carries the sensor 9. The contact fitting 4 is again supported via the switching point 3 and via the support insulator 2 and via the carrier frame 1. The sensor 9 is arranged such that it is spanned by the first contact fitting 4, on the one hand. On the other hand, the sensor 9 is likewise spanned by the overhead line 6, which comes into contact with the first contact fitting 4. Both the overhead line 6 and the first contact fitting 4 thereby provide mechanical protection or a mechanical superstructure of the sensor 9, wherein the sensor 9 itself is carried by this mechanical superstructure. For this purpose, the sensor 9 faces a bearing surface of the first contact fitting 4 that carries the sensor 9 and is preferably fixed to the first contact fitting 4 in an angularly fixed manner. A surface, facing away from the first contact fitting 4 and from the bearing surface, of the sensor 9 protrudes in the direction of the ground potential, that is to say in the direction of the force-absorbing carrier frame 1. This also guarantees dielectric shielding in addition to mechanical shielding of the sensor 9 by the first contact fitting 4 or the overhead line 6 fastened there. The orientation of the sensor 9 may thereby furthermore bring about only a certain amount of influencing of the electrical field that is established around the switching point 3. As an alternative or in addition, a sensor 9 may also be arranged on the second contact fitting 5.

The sensor 9 is an energy-self-sufficient sensor 9, that is to say the sensor 9 draws the electrical energy required for its operation from the environment in which the sensor is arranged. This may in this case preferably be a sensor that converts thermal energy present in its environment into electrical energy and thus provides a supply of electricity to the sensor 9. To this end, it is possible in particular to make use of the bearing surface of the sensor 9 that bears on the first contact fitting 4, such that thermal energy is able in particular to be introduced into the sensor 9 there and converted. Other sensors may however also be used, these likewise operating in an energy-self-sufficient manner. By way of example, irradiated light, for example atmospheric light, or irradiation of the sensor 9 by way of laser light may be used to wirelessly couple in energy in order to supply the sensor 9. The energy generated in the sensor 9 is used to operate the sensor 9. In this case, the sensor has sensing means that serve to sense a physical variable, in particular preferably a temperature, but also an air humidity, an air pressure, a wind speed, a voltage and/or a mechanical tension, a current, an acceleration, a change in position, for example incline, etc. The information ascertained by the sensing means is radiated via a wireless radiation unit of the sensor 9. The information is radiated by the radiation unit in a preferred radiation direction 16 to a ground potential, here preferably in the direction of the carrier frame 1. As an alternative, radiation to a mast may also take place.

FIG. 2 shows a switching unit with a horizontal structure. The switching unit with a horizontal structure again has a carrier frame 1*a* on which a support insulator 2*a* is arranged. A distribution housing 10, from which a first switching point 11 and a second switching point 12 extend away in a manner opposing one another, is arranged on the support insulator 2*a*, facing away from the carrier frame 1*a*. The two switching points 11, 12 each have an electrically insulating housing, each of which has a substantially hollow design. The hollow axes are in this case oriented in a horizontal direction and are located substantially plumb to the vertically oriented support insulator 2*a* of the horizontal switching unit. The two switching points 11, 12 are in this case electrically connected in series. The electrical series connection is preferably implemented via the electrically conductive distribution housing 10. As such, the distribution housing 10 forms a contact fitting 10 in order to connect the switching points 11, 12 to one another. The distribution housing 10 may accordingly serve to receive the sensor 9*a*. Respective contact fittings 4*a*, 5*a* are arranged on the free ends, that is to say on the end faces on the insulating housings of the switching points 11, 12. The contact fittings 4*a*, 5*a* serve in this case, in the same way as the exemplary embodiment according to FIG. 1, to create contact between the series-connected switching points 11, 12 and overhead lines 6, 7. The overhead lines 6, 7, in the same way as the embodiment in FIG. 1, have a multi-core design, such that it is possible to distribute the electric current over multiple cores of the overhead lines 6, 7. Respective bolts 8 are provided in order to create the electrical contact. One contact-based embodiment is shown in more detail for example in FIG. 4. A sensor 9*a* is arranged on an end face of the insulating housing of the first switching point 11, on the first contact fitting 4*a*. The sensor 9*a* is in this case spanned by the overhead line 6 that is in electrical contact with the first contact fitting 4*a*. The sensor 9*a* is furthermore masked by the first contact fitting 4*a* by virtue of the sensor 9*a* being arranged in a manner located substantially within the enveloping contour of the first contact fitting 4*a*, in particular within the enveloping contour of the first switching point 11. With regard to using or making use of the sensor 9*a*, reference is made to the explanations regarding the vertical switching unit according to FIG. 1.

FIG. 3 shows an electrical switching unit with a dead tank structure. The electrical switching unit has a switching point 13 that is surrounded by an electrically conductive housing 14. The electrically conductive housing 14 of the switching point 13 has ground potential applied thereto. Switching contact parts, able to be moved in relation to one another, of the switching point 13 are arranged inside the electrically conductive housing of the switching point 13. In order to be able to achieve electrically insulated contact or incorporation of a switching unit with a dead tank structure, outdoor bushings 14*a*, 14*b* are provided via flange supports. The outdoor bushings 14*a*, 14*b* provide electrically insulating housings that are each fastened on a flange support at a first end. A first and a second contact fitting 4*b*, 5*b* are connected to the free ends of the outdoor bushings 14*a*, 14*b*. Respective phase conductors are arranged inside the outdoor bushings 14*a*, 14*b* and lead into the environment of the switching unit with a dead tank structure in a manner electrically insulated from the switching point 13. The first and the second contact fitting 4*b*, 5*b* are arranged on the free ends of the outdoor bushings 14*a*, 14*b*. Overhead lines 6, 7 are able to be connected to the switching point 13 via the contact fittings 4b, 5b. The overhead lines 6, 7 are electrically conductively connected to the first and the second contact fitting 4b, 5b via bolts 8. A sensor 9b is arranged on the first contact fitting 4b. The sensor 9b is in this case arranged underneath the first contact fitting 4b such that the sensor 9b is spanned essentially by the first contact fitting 4b and additionally by the overhead line 6. The first contact fitting 4b masks the sensor 9b.

In order to achieve a sufficient distance between the free ends of the outdoor bushings 14a, 14b, the outdoor bushings 14a, 14b are arranged on the electrically conductive housing of the switching point 13 in a manner tilted in opposing directions from a vertical direction. The protective function that is achieved through the first contact fitting 4b and the overhead line 6 is accordingly boosted by the tilting. The radiation direction 16 of the sensor 9b is in this case again oriented in the direction of ground potential, such that a reception device may be arranged there more easily. With regard to design, use and function of the sensor 9b, reference is made to the explanations according to the sensors 9, 9a in the exemplary embodiments according to FIGS. 1 and 2.

The exemplary embodiments according to FIGS. 1, 2 and 3 show respective contact fittings 4, 4a, 4b, 5, 5a, 5b. The contact fittings 4, 4a, 4b, 5, 5a, 5b are shown in perspective in FIGS. 4 and 5. A contact fitting 4, 4a, 4b, 5, 5a, 5b should be brought into electrically conductive contact firstly with the respective switching point 3, 11, 12, 13 of the respective switching unit. For dielectric stabilization, the contact fitting 4, 4a, 4b, 5, 5a, 5b for this purpose has four recesses arranged on a circular path, by way of which a contact fitting 4, 4a, 4b, 5, 5a, 5b is brought into electrical contact with and held mechanically on a switching unit by way of bolts. A suitable position of the contact fitting 4, 4a, 4b, 5, 5a, 5b is able to be set by a rotation on the circular path.

The contact fittings 4, 4a, 4b, 5, 5a, 5b furthermore form a tab in which multiple apertures are arranged. Bolts 8 are able to be passed through the apertures, to which bolts an overhead line 6 is able to be electrically conductively connected, for example by way of cable shoes 15. Depending on the design of the overhead line 6, multiple cores of the overhead lines 6 are able to be connected in a manner distributed over the multiple apertures and multiple bolts 8 arranged there. A respective sensor 9, 9a, 9b is arranged on the first contact fittings 4, 4a, 4b. The radiation characteristic of a radiation unit of the sensor 9, 9a, 9b is in this case oriented such that it radiates preferably substantially in the direction of ground potential.

FIG. 4 shows for example the use of a bolt 8 and of a cable shoe 15 for a core of an overhead line 6.

FIG. 5 shows an alternative perspective view of the first contact fitting 4, 4a, 4b, as is known from FIG. 4. The sensor 9, 9a, 9b bears on the first contact fitting 4, 4a, 4b by way of a bearing surface. The contact surface of the sensor 9, 9a, 9b for example allows thermal energy to be dissipated or introduced or generally to be exchanged between the sensor 9, 9a, 9b and the first contact fitting 4, 4a, 4b. Depending on the installation position of the first contact fitting 4, 4a, 4b, the respective sensor 9, 9a, 9b may be completely masked or covered or delimited by the first contact fitting 4, 4a, 4b. If necessary, the first contact fitting 4, 4a, 4b may however also be designed such that the sensor is arranged laterally or on an end face on an insulating housing (cf. FIGS. 6 and 7). Regardless of the installation position of the sensor 9, 9a, 9b or of the first contact fitting 4, 4a, 4b, the first contact fitting 4, 4a, 4b should be arranged in a manner electrically insulated from a ground potential via an electrically insulating housing, for example of a switching point 3, 11, 12 or of an outdoor bushing 14a, 14b. Transmission of information from the sensor 9, 9a, 9b by a radiation unit should preferably take place in the direction 16 of the ground potential with respect to which the first contact fitting 4, 4a, 4b is kept electrically insulated.

The variant embodiment, shown in FIGS. 4 and 5, of a first contact fitting 4, 4a, 4b has a substantially flat plate-like structure. There may however also be provision for the recesses via which the first contact fitting 4, 4a, 4b is mechanically connected to the switching unit to lie at an angle, in particular plumb, to the multiple apertures for creating electrical contact with an overhead line. By way of example, this may be achieved through angular joining of two discrete plates or angular beveling or angular casting of contact fittings. The angular limbs may in this case for example form an L shape or a T shape with respect to one another. An angular design of a contact fitting makes it possible to achieve the desired manner, in particular with regard to dielectric masking of the sensor 9, 9a, 9b, depending on the installation location.

Figure 6:
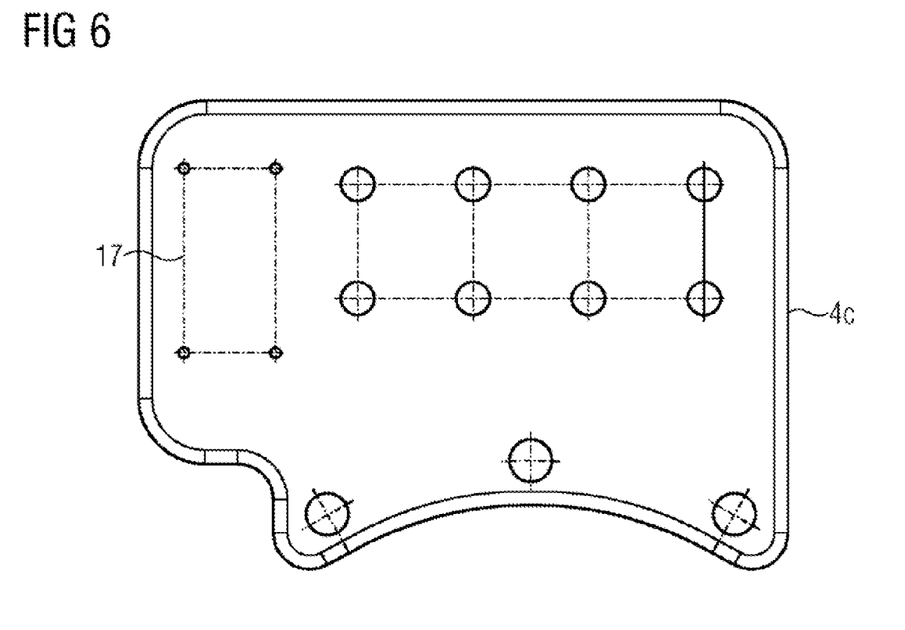
FIG. 6: shows a contact fitting in a first variation.
Figure 7:
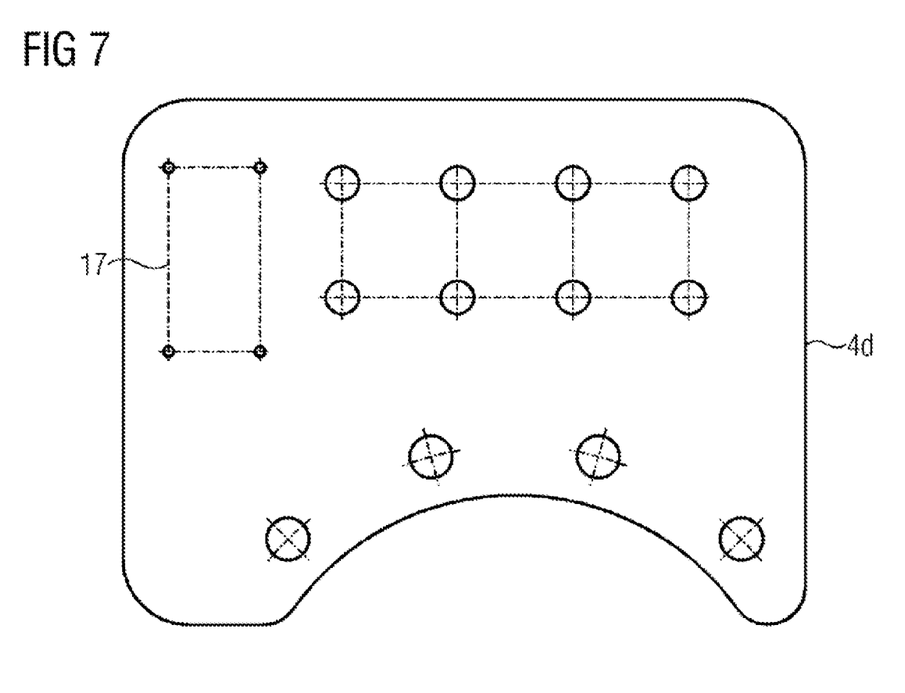
FIG. 7: shows a contact fitting in a second variation.

The contact fittings 4c, 4d in the first and in the second variation shown in FIGS. 6 and 7 have a plate-like design. The contact fitting 4e in the third variation has an angular design, this being designed as a cast part and being provided with a circular base.

The contact fitting 4c in the first variation has a plate-like design, wherein one side of the plate is provided with a concave shape. It is thereby possible to arrange multiple recesses in a manner distributed on a circular path along the concave recess. By virtue of the recesses arranged in a manner distributed on the circular path, the contact fitting 4c in the first variation may for example be brought to bear on and put into electrical contact with a casing-side shoulder or a flange that has a corresponding curvature. It is thus more easily possible to use for example pre-existing sections of a switching unit in order to create electrical contact there with a contact fitting 4c. Multiple apertures are furthermore provided in the plate-like surface of the contact fitting 4c in the first variation, in order to be able to create electrical contact there with overhead lines 6, 7 for example by way of bolts 8 and corresponding cable shoes in the same way as in the exemplary embodiment according to FIGS. 4 and 5.

The contact fitting 4c in the first variation has an asymmetric design, wherein the asymmetry refers to the circular path of the recesses on the convex section of the contact fitting 4c in the first variation. In the asymmetric region, that is to say laterally next to the field having the apertures for the bolts, provision is made for a surface 17 on which a sensor 9, 9a, 9b is able to be positioned. By way of example, there may be provision to this end to screw the sensor 9, 9a, 9b to the contact fitting 4c in the first variation.

FIG. 7 shows a contact fitting 4d in a second variation, this being a continuation of the contact fitting 4c in the first variation known from FIG. 6. In order to achieve an increased contact region for the recesses for attachment to a switching unit, a convex edge on the substantially plate-shaped rectangular contact fitting 4d is arranged in a manner distributed asymmetrically in the edge in the second variation. In the same way, the field with the apertures for the bolts for making contact with the contact fitting 4d in the second variation is also arranged asymmetrically. In comparison with the contact fitting 4c in the first variation, an increased number of recesses for fastening the contact fitting 4d may thus be accommodated in the second variation. In the same way as the refinement of the contact fitting in the first variation 4c, a rectangular surface 17 that is arranged in the asymmetrically broadened region is also provided in the contact fitting in the second variation 4d.

Figure 8:
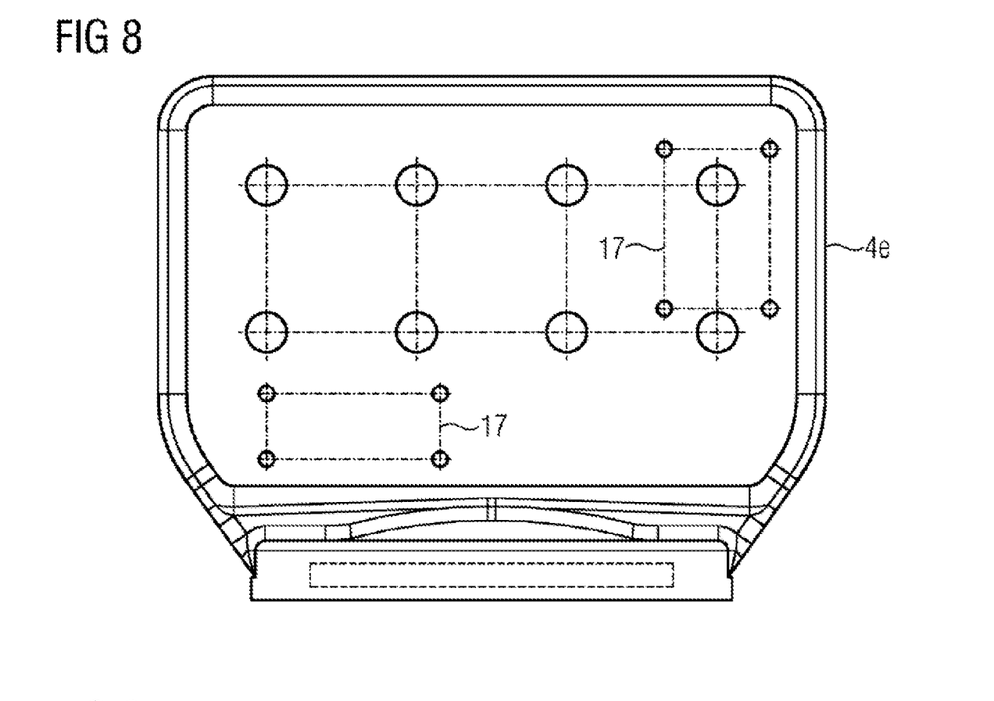
FIGS. 8, 9 and 10 show a contact fitting in a third variation.
Figure 9:
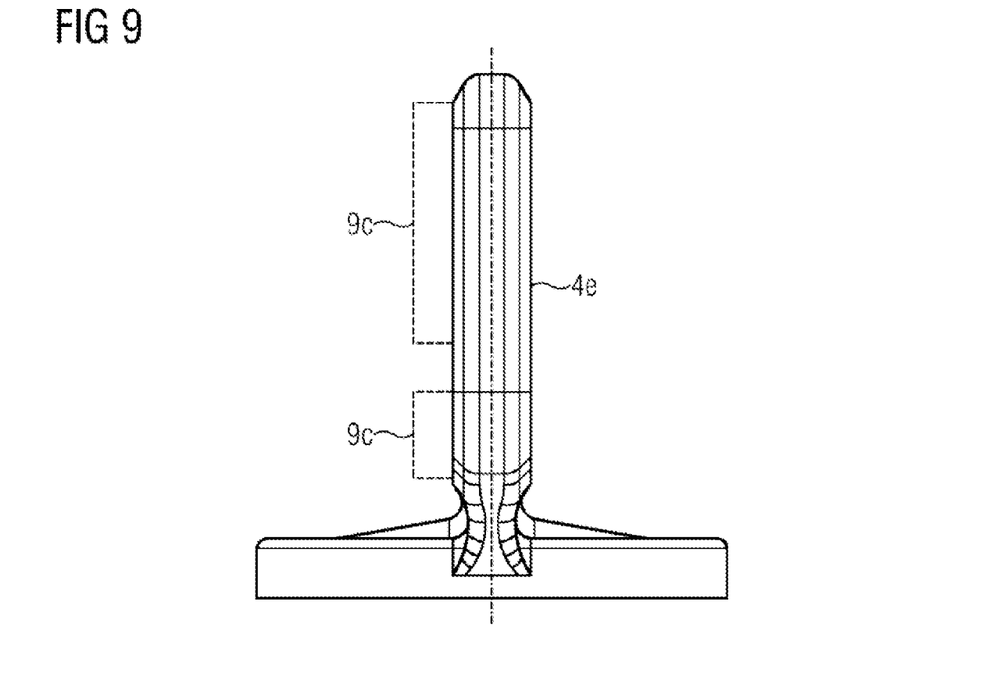
Figure 10:
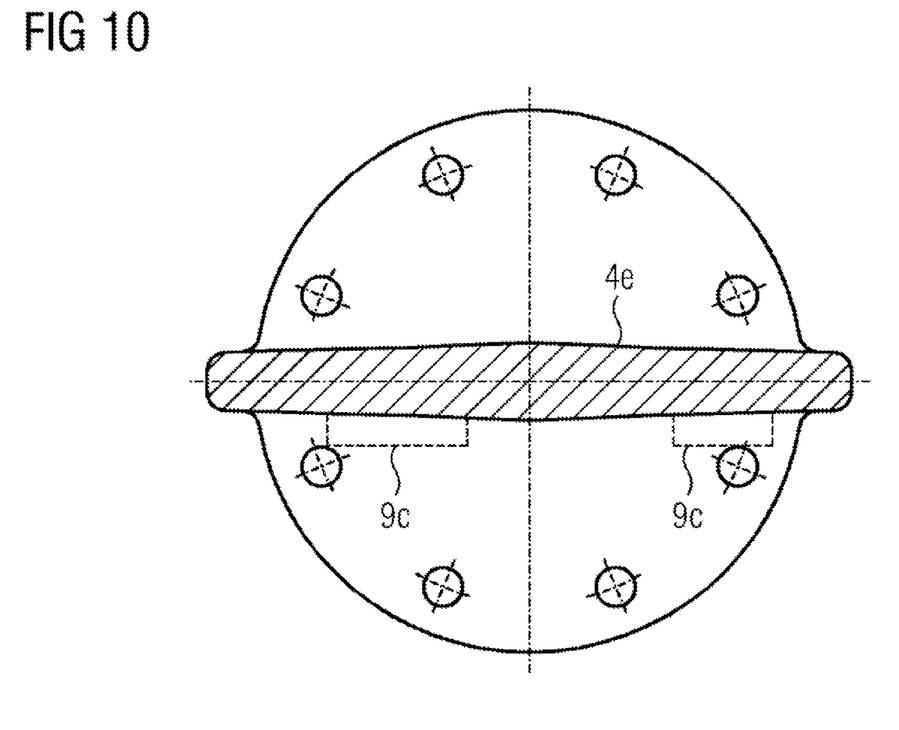

FIGS. 8, 9 and 10 show a contact fitting 4e in a third variation. The contact fitting 4e has a substantially rectangular connection plate in which apertures for making contact with the contact fitting 4e in the third variation are accommodated. This connection plate however sits plumb on a base that has multiple recesses in a manner distributed on a circular path for making contact with the contact fitting 4e in the third variation. By way of example, such a contact fitting 4e in the third variation is able to be placed on an end face on an outdoor bushing. Such an angular arrangement of connection plate and base allows improved masking of the surfaces 17 provided for receiving a sensor 9c. The base and the connection plate enclose an angle that, due to the electrically conductive properties of the contact fitting 4e in the third variation, at least partially enables dielectric shielding of the sensor 9c. By way of example, FIG. 8 shows that a sensor may be positioned close to the origin of the angle vertex. There may however also be provision for a sensor 9c to be able to be arranged at a distance from the angle vertex, for example level with the apertures for receiving the bolts for making contact with overhead lines. Recesses located in the base for creating contact with or for fastening the contact fitting 4e in the third variation 7 may be located in the same way as the circular path described in FIGS. 4 and 5 (with four apertures there). There is thus also the possibility here of selecting the orientation of the contact fitting 4e in the third variation.

The contact fittings 4, 4a, 4b, 4c, 4d, 4e shown in FIGS. 4, 5, 6, 7, 8, 9 and 10 may be swapped with one another and used on different switching units. It is thus possible in particular to apply the contact fitting 4e in the third design variant shown in FIGS. 8, 9 and 10 in the case of the switching unit with a dead tank structure, as shown in FIG. 3. A corresponding rotation of the base of the contact fitting 4e in the third variation here allows suitable dielectric and mechanical shielding of the sensor 9b on the oblique outdoor bushings 14a, 14b.

The invention claimed is:

1. An electrical energy transmission device, comprising:
   a switching unit including a switching point and at least one contact fitting creating an electrical contact with said switching point; and
   a sensor for monitoring a state of said switching unit, said sensor being carried by said at least one contact fitting.

2. The electrical energy transmission device according to claim 1, wherein said sensor is at least partially masked by said at least one contact fitting.

3. The electrical energy transmission device according to claim 1, wherein said sensor has a bearing surface bearing on said at least one contact fitting and a surface facing away from said bearing surface and protruding in a direction of a ground potential.

4. The electrical energy transmission device according to claim 1, wherein said sensor is an energy-self-sufficient sensor.

5. The electrical energy transmission device according to claim 1, wherein said sensor includes a wireless radiation unit having a radiation direction pointing in a direction of a ground potential.

6. The electrical energy transmission device according to claim 1, wherein said sensor is disposed laterally on said at least one contact fitting.

7. The electrical energy transmission device according to claim 1, wherein said switching unit is an outdoor switching unit.

8. The electrical energy transmission device according to claim 1, wherein said sensor is configured to be spanned by an overhead line fastened to said at least one contact fitting.

9. The electrical energy transmission device according to claim 1, wherein said sensor is at least partially spanned by said at least one contact fitting.

10. The electrical energy transmission device according to claim 1, wherein said sensor has a thermally reflective surface structure.

11. The electrical energy transmission device according to claim 1, wherein said switching unit has an end face, and said sensor is disposed on said end face.

* * * * *